United States Patent
Kuk et al.

(10) Patent No.: US 8,942,740 B2
(45) Date of Patent: Jan. 27, 2015

(54) SYSTEM FOR PROVIDING APPLICATION AND MANAGEMENT SERVICE AND MODIFYING USER INTERFACE AND METHOD THEREOF

(75) Inventors: Seung-Pyo Kuk, Seoul (KR); Chil-Hyun Baek, Seoul (KR); Tae-Hyo Ahn, Seoul (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/437,580

(22) Filed: Apr. 2, 2012

(65) Prior Publication Data

US 2012/0190330 A1 Jul. 26, 2012

Related U.S. Application Data

(60) Continuation of application No. 12/701,238, filed on Feb. 5, 2010, which is a division of application No. 11/569,899, filed as application No. PCT/KR2005/001649 on Jun. 2, 2005, now Pat. No. 8,014,799.

(30) Foreign Application Priority Data

| Jun. 2, 2004 | (KR) | 10-2004-0039949 |
| Jun. 4, 2004 | (KR) | 10-2004-0040680 |
| Jun. 8, 2004 | (KR) | 10-2004-0041816 |

(51) Int. Cl.
*H04M 1/725* (2006.01)
*H04W 24/00* (2009.01)
(Continued)

(52) U.S. Cl.
CPC ............ *H04M 1/72525* (2013.01); *H04W 4/00* (2013.01); *H04W 4/14* (2013.01)

USPC ......... 455/466; 455/414.1; 455/418; 709/223

(58) Field of Classification Search
CPC ........................................................ H04W 4/12
USPC .................. 455/414.1, 418, 466; 709/223
See application file for complete search history.

(56) References Cited

U.S. PATENT DOCUMENTS

| 6,112,244 A | 8/2000 | Moore et al. |
| 6,188,909 B1 | 2/2001 | Alanara et al. |
| 6,275,710 B1 | 8/2001 | Oinonen et al. |

(Continued)

FOREIGN PATENT DOCUMENTS

| JP | 2000-049436 A | 2/2000 |
| JP | 2002-199099 A | 7/2002 |

(Continued)

*Primary Examiner* — Qun Shen
(74) *Attorney, Agent, or Firm* — IP Legal Services, LLC

(57) ABSTRACT

Disclosed is a system for downloading an application from a server and providing the same to a client by using a short message or a subscriber interface module (SIM) card. The system modifies a function key for each application according to a client's selection, and randomly modifies a user interface used for selecting an application. The system extends a usage range of the SIM card. The system periodically checks and analyzes the client' use log for a predetermined time, presents at least one application to the client according to the analysis result on the use log, provides a single application selected by the client to the client, and updates at least one application stored in the client mobile terminal according to the analysis result on the use log. Therefore, the system increases service satisfaction for the client.

18 Claims, 13 Drawing Sheets

(51) Int. Cl.
*H04W 4/00* (2009.01)
*H04W 4/14* (2009.01)

(56) References Cited

U.S. PATENT DOCUMENTS

| | | | |
|---|---|---|---|
| 6,292,668 B1 | 9/2001 | Alanara et al. | |
| 6,829,611 B2 | 12/2004 | Majewski et al. | |
| 7,072,672 B1 | 7/2006 | Vanska et al. | |
| 7,088,990 B1 | 8/2006 | Isomursu et al. | |
| 7,130,622 B2 | 10/2006 | Vanska et al. | |
| 7,181,427 B1 | 2/2007 | DeFrancesco et al. | |
| 7,363,354 B2 | 4/2008 | Lahti | |
| 7,454,545 B2 | 11/2008 | Kohno et al. | |
| 2001/0049289 A1 | 12/2001 | Kim | |
| 2001/0056462 A1 | 12/2001 | Kataoka | |
| 2002/0037750 A1* | 3/2002 | Hussain et al. | 455/564 |
| 2002/0065110 A1 | 5/2002 | Enns et al. | |
| 2002/0068554 A1 | 6/2002 | Dusse | |
| 2002/0147772 A1 | 10/2002 | Glommen et al. | |
| 2002/0188736 A1 | 12/2002 | Jarvensivu | |
| 2003/0101246 A1* | 5/2003 | Lahti | 709/221 |
| 2003/0167230 A1 | 9/2003 | McCarthy | |
| 2004/0107277 A1 | 6/2004 | Levesque et al. | |
| 2004/0176107 A1 | 9/2004 | Chadha | |
| 2004/0187008 A1 | 9/2004 | Harada et al. | |
| 2004/0203681 A1* | 10/2004 | Ross et al. | 455/418 |
| 2004/0250238 A1* | 12/2004 | Singh et al. | 717/108 |
| 2004/0260807 A1 | 12/2004 | Glommen et al. | |
| 2005/0044191 A1* | 2/2005 | Kamada et al. | 709/223 |
| 2005/0060250 A1 | 3/2005 | Heller et al. | |
| 2005/0197111 A1 | 9/2005 | Alanara et al. | |
| 2005/0277432 A1 | 12/2005 | Viana et al. | |
| 2006/0156209 A1* | 7/2006 | Matsuura et al. | 714/798 |
| 2007/0087765 A1 | 4/2007 | Richardson et al. | |
| 2008/0039056 A1 | 2/2008 | Mathews et al. | |

FOREIGN PATENT DOCUMENTS

| | | |
|---|---|---|
| JP | 2002-340572 A | 11/2002 |
| JP | 2003-150297 A | 5/2003 |
| JP | 2003-298722 A | 10/2003 |
| JP | 2006-505182 A | 2/2006 |
| KR | 20030020101 A | 3/2003 |
| KR | 20030081817 A | 10/2003 |
| WO | 03075584 A2 | 9/2003 |
| WO | 2004/040923 A1 | 5/2004 |
| WO | 2004040923 A1 | 5/2004 |

* cited by examiner

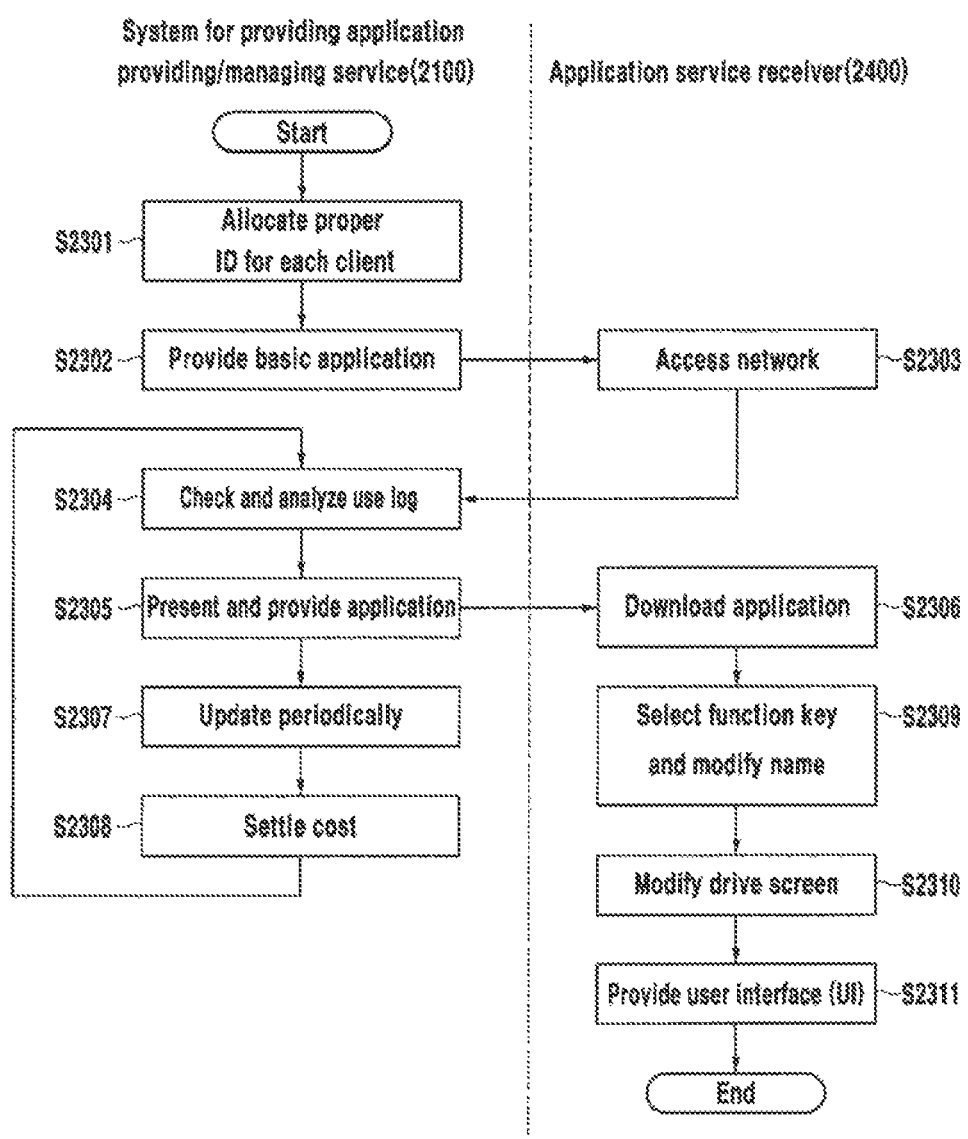

SYSTEM FOR PROVIDING APPLICATION AND MANAGEMENT SERVICE AND MODIFYING USER INTERFACE AND METHOD THEREOF

CROSS REFERENCE TO RELATED APPLICATIONS

This application is a continuation of pending U.S. patent application Ser. No. 12/701,238 (filed in the U.S. Patent and Trademark Office on Feb. 5, 2010), which is a divisional of U.S. application Ser. No. 11/569,899, filed Mar. 6, 2007 now U.S. Pat. No. 8,014,799, which was a National Stage entry into the U.S. of PCT/KR2005/001649 filed Jun. 2, 2005, and claims priority from KR10-2004-0039949 filed Jun. 2, 2004, KR10-2004-0040680 filed Jun. 4, 2004 and KR10-2004-0041816 filed Jun. 8, 2004, all said applications are hereby incorporated herein in their entireties by reference.

BACKGROUND OF THE INVENTION

1. Technical Field

The present invention relates to a system and method for providing an application and a management service and modifying a user interface. More specifically, the present invention relates to a system and method for providing an application to a mobile terminal by using a short message or a subscriber interface module (SIM) card, providing a management service, and modifying a user interface for each application.

2. Background Art

As functions of mobile terminals have been diversified and upgraded, various functions such as transmission and reception of short messages and moving picture mails, a phonebook, a scheduler, a calculator, a telephone directory, and a moving picture game have been added in addition to voice call processing which is an essential function of the mobile terminal.

Further, when a user selects various functions on the mobile terminal, drive screens corresponding to the respective function keys are displayed in various ways, and the drive screens are modifiable according to the user's preference irrespective of time and location.

The modifiable drive screens are stored in the mobile terminal in its manufacturing process, and reduce the user's service satisfaction because the number of modifiable drive screens is very much limited.

The function for bookmarking frequently accessed web sites into Favorites from among the various additional functions of the mobile terminals also provides services undesirable by the user when the service of the corresponding uniform resource locator (URL) is changed.

One of European communication schemes for mobile terminals is the global system for mobile communication (GSM).

The GSM uses a SIM card for certifying the mobile terminal user and registering networks, and the SIM card is a smart card that is removable from the mobile terminal, includes a microprocessor and a memory chip, and is classified as an IC card type and a plug-in type.

The SIM card stores subscriber information and mobile terminal operational data that are installed and loaded to the mobile terminal, that is, subscriber information such as a user password and data for network registration. Hence, the application of the SIM card is limited.

In addition, provided is a function for analyzing used logs of the respective mobile terminals and recommending and providing URLs of wireless Internet services frequently used by the corresponding client.

However, the conventional URL recommendation function generally personalizes initial menus, provides recommendation menus, and provides the client's usage history, and hence, it provides limited services and worsens the client's service satisfaction.

In detail, the application field of personalization is provided when a browser or a platform is driven after the client accesses the wireless Internet by using his mobile terminal, and the application field is limited and is only provided to the client who is skillful in using the wireless Internet.

Therefore, it is not easy for the client who is not skillful in downloading applications to directly download applications of new versions and use the same.

In addition, provided is a function for analyzing used logs of the respective mobile terminals and recommending and providing URLs of wireless Internet services frequently used by the corresponding client.

However, the conventional URL recommendation function generally personalizes initial menus, provides recommendation menus, and provides the client's usage history, and hence, it provides limited services and worsens the client's service satisfaction.

In detail, the application field of personalization is provided when a browser or a platform is driven after the client accesses the wireless Internet by using his mobile terminal, and the application field is limited and is only provided to the client who is skillful in using the wireless Internet.

Therefore, it is not easy for the client who is not skillful in downloading applications to directly download applications of new versions and use the same.

That is, the conventional mobile terminal causes inconvenience of accessing or searching for a plurality of URLs by the client when the client attempts to download a desired application (e.g., an application for executing a character raising game such as Tamagutchi), which wastes the user's time and money and worsens service satisfaction.

BRIEF SUMMARY OF THE INVENTION

Disclosure

Technical Problem

It is an advantage of the present invention to allow downloading of a specific application including a game depending on a connection state of a short message.

It is another advantage of the present invention to allow downloading of at least one application by using an application ID stored in a SIM card, and thereby increase the application field of SIM card.

It is still another advantage of the present invention to allow selecting of a function key corresponding to the downloaded application, and allow the client to modify the name of the selected function key.

It is still yet another advantage of the present invention to update the applications stored in the mobile terminal or periodically provide new applications by periodically checking used logs of client mobile terminals.

Technical Solution

In a first aspect of the present invention, in a system connected to a server for providing a user interface modifying/ providing service through a wired/wireless communication network, the system for receiving a short message from the server and modifying the user interface, a user interface modifying system using an SMS comprises: an application downloader for downloading at least one application from the server according to a granted state of the client having received the short message; a function key selector/modifier for establishing a function key that corresponds to the downloaded application on a client mobile terminal, and modifying a name of the established function key; a drive screen modifier for modifying a screen displayed when the downloaded application is driven; and an interface provider for driving the application that corresponds to a clicked function key and concurrently displaying the modified drive screen when the established function key is clicked.

In a second aspect of the present invention, in a mobile communication terminal connected to a server for providing a user interface modifying/providing service through a wired/wireless network, the mobile communication terminal for receiving a short message from the server, a mobile communication terminal comprises: an application downloader for downloading at least one application from the server according to a granted state of the client having received the short message (the short message is for designating a name of the application and a function key on the mobile communication terminal corresponding to the application); a function key selector/modifier for establishing a function key that corresponds to the downloaded application on a client mobile terminal, and modifying a name of the established function key; a drive screen modifier for modifying a screen displayed when the downloaded application is driven; and an interface provider for driving the application that corresponds to a clicked function key and concurrently displaying the modified drive screen when the established function key is clicked.

In a third aspect of the present invention, in a method for modifying a user interface by receiving a short message from a server in a system connected to the server for providing a user interface modifying/providing service through a wired/wireless communication network, a user interface modifying method using an SMS comprises: a) receiving, from the server, a short message on a name of an application and a designation of a function key on a client mobile terminal corresponding to the application; b) downloading at least one application from the server according to a granted state of the client having received the short message; c) establishing a function key that corresponds to the downloaded application on the client mobile terminal, and modifying a name of the established function key; d) modifying a drive screen of the downloaded application; and e) driving an application that corresponds to a clicked function key and concurrently displaying the modified drive screen when the established function key is clicked.

In a fourth aspect of the present invention, in a method for providing an application to a client mobile terminal and managing the application in a system connected to the client mobile terminal through a wired/wireless network, a method for providing an application providing/managing service using an SMS comprises: analyzing personal information on the client, and determining an application for the client according to analysis results; transmitting a short message for downloading the determined application to the client mobile terminal; providing at least one application to the client mobile terminal according to a granted state of the client having received the short message; and providing a per-application cost to each client, and settling the per-application cost.

In a fifth aspect of the present invention, in a recording medium including a method for receiving a short message from a server and modifying a user interface in a system connected through a wired/wireless network to the server for providing a user interface modifying/providing service, a computer readable recording medium including a program comprises: a) receiving, from the server, a short message on a name of an application and a designation of a function key on a client mobile terminal corresponding to the application; b) downloading at least one application from the server according to a granted state of the client having received the short message; c) establishing a function key that corresponds to the downloaded application on the client mobile terminal, and modifying a name of the established function key; d) modifying a drive screen of the downloaded application; and e) driving an application that corresponds to a clicked function key and concurrently displaying the modified drive screen when the established function key is clicked.

In a sixth aspect of the present invention, in a system for receiving an application from a server and providing and managing the application, the system being connected through a wired/wireless network to the server for providing a subscriber interface module (SIM) card and managing the SIM card, an application providing and managing system using a SIM card comprises: a SIM card detector/reader for detecting a SIM card installed in a client mobile terminal and reading a proper application ID stored in the detected SIM card; a data transmitter/receiver for transmitting the read proper application ID to the server through the wired/wireless network; and an application downloader for downloading a single application selected by the client from among at least one application presented by the server from the server.

In a seventh aspect of the present invention, in a method for receiving an application from a server and providing and managing the application in a system connected through a wired/wireless network to the server for providing a subscriber interface module (SIM) card and managing the SIM card, an application providing and managing method using a SIM card comprises: a) detecting a SIM card installed in a client mobile terminal, and reading a proper application ID stored in the detected SIM card; b) transmitting the read proper application ID to the server through the wired/wireless network; c) downloading a single application selected by the client from among at least one application presented by the server from the server; d) establishing the function key that corresponds to the downloaded application on the client mobile terminal according to the client's selection; e) modifying a drive screen displayed when the downloaded application is performed, according to the client's request; and f) driving an application that corresponds to a clicked function key and concurrently displaying the modified drive screen when the established function key is clicked.

In an eighth aspect of the present invention, in a method for providing an application to a client mobile terminal and managing the application in a system connected to the client mobile terminal through a wired/wireless network, an application providing/managing service providing method using a subscriber interface module (SIM) card comprises: allocating a proper ID to at least one application, and storing the allocated proper ID in the SIM card; checking whether the application ID received from the client mobile terminal is a normally allocated proper ID; and presenting at least one application according to checked results, and providing a single application selected by the client from among the presented applications to the client mobile terminal.

In a ninth aspect of the present invention, in a recording medium including a method for receiving an application from a server and providing and managing the application in a system connected through a wired/wireless network to the server for providing a subscriber interface module (SIM) card and managing the SIM card, a computer readable recording medium including a program comprises: a) detecting a SIM card installed in a client mobile terminal, and reading a proper application ID stored in the detected SIM card; b) transmitting the read proper application ID to the server through the wired/wireless network; c) downloading a single application selected by the client from among at least one application presented by the server from the server; d) establishing the function key that corresponds to the downloaded application on the client mobile terminal according to the client's selection; e) modifying a drive screen displayed when the downloaded application is performed, according to the client's request; and f) driving an application that corresponds to a clicked function key and concurrently displaying the modified drive screen when the established function key is clicked.

In a tenth aspect of the present invention, in a system for providing an application providing/managing service, the system connected to a client mobile terminal through a wired/wireless network, a system for providing an application providing/managing service comprises: an ID allocator/manager for allocating a proper ID to each client mobile terminal, and managing the ID; a use log checker/statistic unit for periodically checking and analyzing a use log for each client mobile terminal connected to the wired/wireless network through the allocated proper ID for a predetermined time; an application presenter/provider for presenting at least one application according to the analysis results, and providing a single application selected by the client from among the presented applications to the client mobile terminal; and an application updater for updating the at least one application stored in the client mobile terminal according to the analysis results.

In an eleventh aspect of the present invention, in a method for providing an application providing/managing service to a client mobile terminal in a system connected to the client mobile terminal through a wired/wireless network, a method for providing an application providing/managing service comprises: a) allocating a proper ID to each client mobile terminal and managing the ID; b) periodically checking and analyzing a use log for each client mobile terminal connected to the wired/wireless network through the allocated proper ID for a predetermined time; c) presenting at least one application to the client mobile terminal according to the analysis results, and providing a single application selected by the client from among the presented applications to the client mobile terminal; and d) updating the at least one application stored in the client mobile terminal according to the analysis results.

In a twelfth aspect of the present invention, in a method for receiving an application from a service system and managing the application in a system connected through a wired/wireless network to the service system for providing and managing applications, a method for providing and managing an application comprises: downloading a single application from the service system; establishing a function key that corresponds to the downloaded application on the client mobile terminal according to the client's selection, and modifying a name of the established function key; modifying a drive screen of the downloaded application according to the client's request; and driving an application that corresponds to a clicked function key and concurrently displaying the modified drive screen when the established function key is clicked.

In a thirteenth aspect of the present invention, in a recording medium including a method for providing an application providing/managing service to a client mobile terminal in a system connected to the client mobile terminal through a wired/wireless network, a computer readable recording medium including a program comprises: a) allocating a proper ID to each client mobile terminal and managing the ID; b) periodically checking and analyzing a use log for each client mobile terminal connected to the wired/wireless network through the allocated proper ID for a predetermined time; c) presenting at least one application according to the analysis results, and providing a single application selected by the client from among the presented applications to the client mobile terminal; and d) updating the at least one application stored in the client mobile terminal according to the analysis results.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 13 shows a flowchart of an operation by the system for providing an application providing and managing service shown in FIG. 11.

BEST MODE

Figure 1:
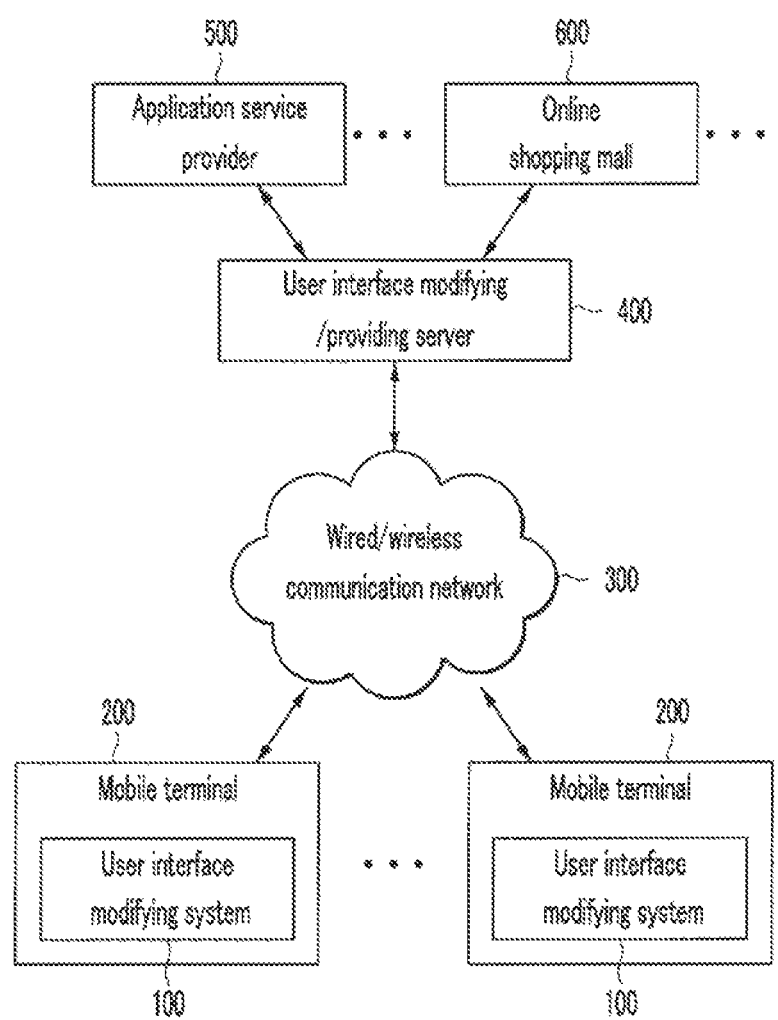
FIG. 1 shows a user interface modifying system of a mobile terminal using an SMS according to a first embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

odA system and method for downloading an application and providing the application to a mobile terminal by using an SMS will now be described.

FIG. 1 shows a user interface modifying system of a mobile terminal using an SMS according to a first embodiment of the present invention.

As shown, the user interface modifying system 100 is provided in a mobile terminal 200, the mobile terminal 200 is connected to a user interface modifying/providing server 400 through a wired/wireless communication network 300, and the user interface modifying/providing server 400 is connected to a plurality of application service providers 500 and online shopping malls 600.

The user interface modifying system 100 according to the first embodiment includes no user interface modifying/providing server 400, but other embodiments may include the same.

The above-configured user interface modifying system 100 will now be described.

The user interface modifying/providing server 400 analyzes personal information on the respective clients (e.g., ages, occupations, hobbies, and family relationship), and transmits a short message for providing a specific application to the mobile terminal 200 through the wired/wireless communication network 300.

The first embodiment discloses transmission of a short message for providing a specific application according to analysis results after analyzing personal information on the respective clients, and the first embodiment may also provide an appropriate application according to a request by the client if needed.

The user interface modifying system 100 displays the received short message to a monitor on the mobile terminal and downloads a corresponding application from the user interface modifying/providing server 400 according to the client's allowance of reception.

The user interface modifying/providing server 400 is described to provide a plurality of applications, and the application service provider 500 may also directly provide the applications.

The user interface modifying system 100 controls the client to select a function key that corresponds to the downloaded application and modify the name of the selected function key.

In addition, the user interface modifying system 100 instantly drives the application corresponding to the clicked function key when the client clicks the function key, and a screen of the driven application may also be modified to another drive screen according to a request by the client. That is, the drive screen may be modified with pictures of friends or various avatars stored in the mobile terminal 200.

In the user interface modifying method of a mobile terminal using an SMS according to the first embodiment of the present invention, a short message for directly downloading an application related to a game according to per-client personal information is provided, and the application is directly downloaded depending on a connection state on the received short message.

As a result, the present invention prevents the client from wasting time and costs for downloading desired applications, and increases usage efficiencies of various function keys of each mobile terminal.

The present invention controls the client to select a function key that corresponds to the downloaded application, modify the name of the selected function key, and also modify the screen of the driven application to a desired screen.

Therefore, the present invention provides a user interface that allows the client to change the application mapped on a specific function key to another one, and thus increase service satisfaction.

Figure 2:
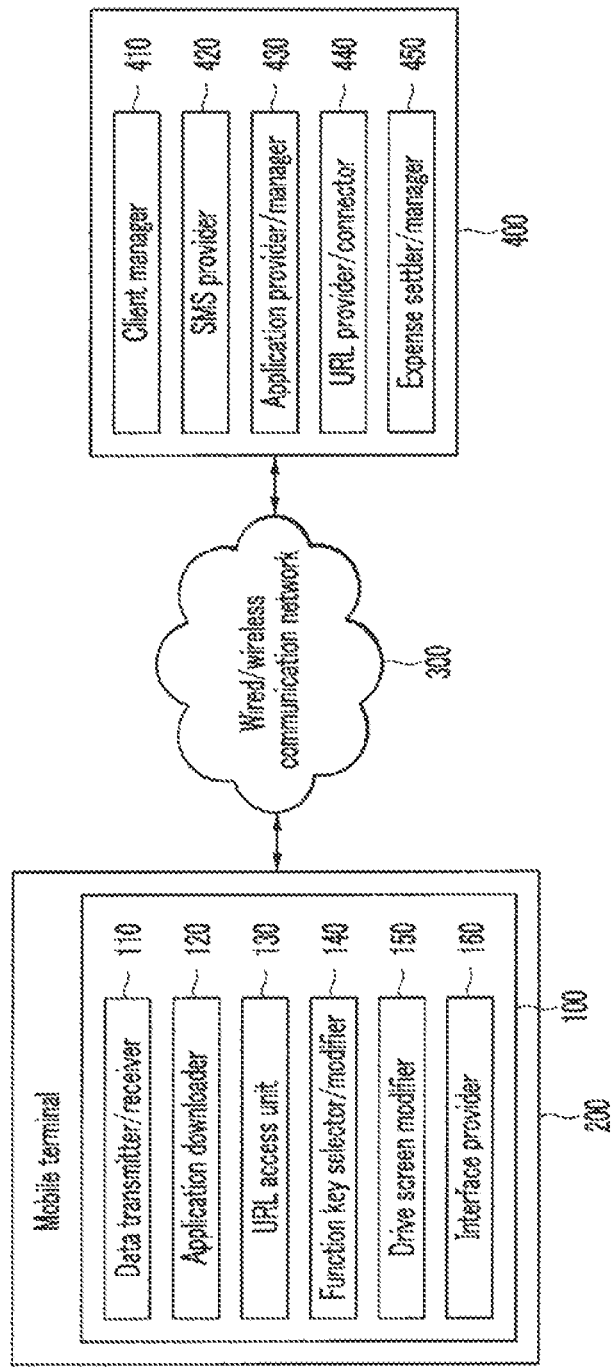
FIG. 2 shows a detailed configuration of the user interface modifying system shown in FIG. 1.

FIG. 2 shows a detailed configuration of the user interface modifying system shown in FIG. 1.

As shown in FIG. 2, the user interface modifying system 100 includes a data transmitter/receiver 110, an application downloader 120, a URL access unit 130, a function key selector/modifier 140, a drive screen modifier 150, and an interface provider 160.

The user interface modifying/providing server 400 includes a client manager 410, an SMS provides 420, an application provider/manager 430, a URL provider/connector 440, and an expense settler/manager 450.

In detail, the client manager 410 of the user interface modifying/providing server 400 analyzes per-client personal information (e.g., age, hobby, occupation, and family relationship) and determines what application or URL is required for the client.

That is, the client manager 410 determines an application related to a specific game (e.g., Tamagutchi) when the client's hobby is playing games, or determines a URL of an online shopping mall for selling birthday gifts when a member of the client's family marks a birthday.

The SMS provider 420 transmits the determined application (or the URL) and a short message for guiding establishment of a function key that corresponds to the application to the mobile terminal 200 through the wired/wireless communication network 300.

The application provider/manager 430 provides at least one application to the mobile terminal 200 according to the connection state of the transmitted short message, and additionally develops or manages a new application.

The URL provider/connector 440 controls the mobile terminal 200 to access at least one URL according to the connection state of the transmitted short message, and allows searching and buying a product at the accessed URL.

At least one application is provided and a URL access is provided in the first embodiment, and without being restricted to this, the application service provider 500 may directly provide the application, or the online shopping mall 600 may directly provide the URL access.

The expense settler/manager 450 provides and settles a service charge, that is, a predetermined per-application expense (e.g., 800 Won (Korean currency unit)) that is provided depending on the connection state of the short message transmitted to the mobile terminal 200.

Next, the data transmitter/receiver 110 of the user interface modifying system 100 receives the short message from the SMS provider 420 through the wired/wireless communication network 300, or controls the application granted by the client to be normally provided to the mobile terminal 200.

The application downloader 120 downloads at least one application from the application provider/manager 430 according to a granted state of the client having received the short message.

The URL access unit 130 accesses a specific URL through the URL provider/connector 440 according to the granted state of the client having received the short message.

The function key selector/modifier 140 controls to select a function key that corresponds to the downloaded application and modify the name of the selected function key according to the client's preference, and provides a user interface through which the client may change the application mapped on the specific function key according to his will.

The function key selector/modifier 140 may modify the name of the function key changed by the client into another name (one of second to nth names) depending on the requirement of the client. That is, the function key selector/modifier 140 provides an interface for modifying the name of the function key corresponding to the downloaded application at least twice.

The drive screen modifier 150 modifies the screen displayed when the downloaded application is driven into another drive screen with a different background according to the client's selection.

That is, when the client desires to change the drive screen of an application with a boyfriend's photo stored in the mobile terminal 200, the drive screen modifier 150 changes the drive screen of an application with the photo selected by the client.

In this instance, the drive screen modifier 150 provides a preview screen to the client and controls the client to preview the drive screen of the application and either modify the drive screen or use the drive screen as it is.

Further, the drive screen modifier 150 controls the client to establish a single specific image as a drive screen, and randomly displays at least one image managed by a storage box (not illustrated) in the client mobile terminal 200 to the client, and the client then randomly selects and drives the specific image file as a drive screen of the downloaded application.

When the client clicks a specific function key on the mobile terminal, the interface provider 160 instantly provides the application that corresponds to the clicked function key, so that the client may play the desired game on the client's mobile terminal without accessing the network each time when the downloaded application is a game-related application such as Tamagutchi.

That is, the client is prevented from wasting time and costs for downloading desired applications, and the usage of various function keys on the mobile terminal is increased.

An operation by the above-configured user interface modifying system of a mobile terminal using an SMS will now be described with reference to drawings.

Figure 3:
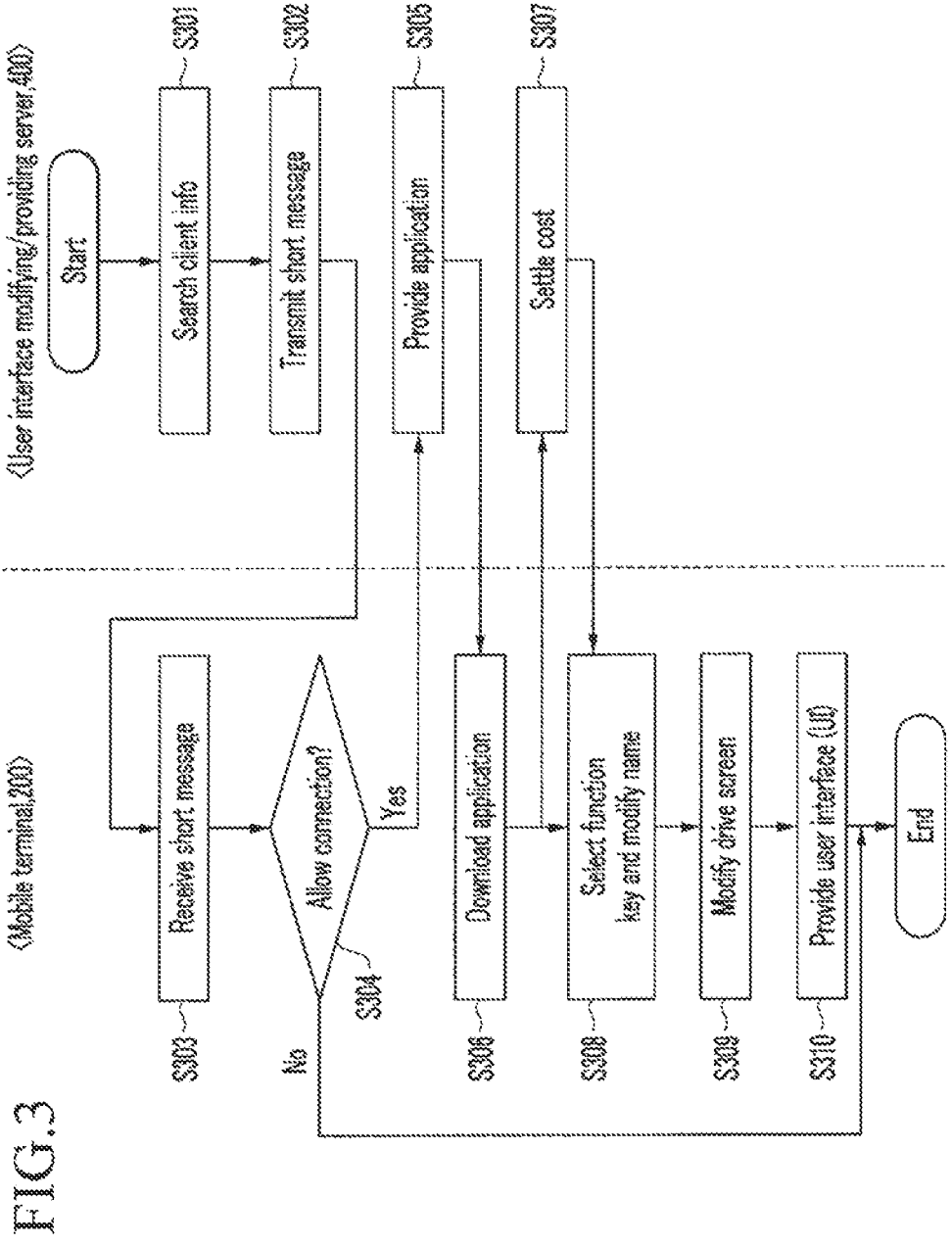
FIG. 3 shows a flowchart of an operation by the user interface modifying system shown in FIG. 2.

FIG. 3 shows a flowchart of an operation by the user interface modifying system shown in FIG. 2.

As shown, the client manager 410 of the user interface modifying/providing server 400 analyzes per-client personal information (ages, hobbies, occupations, and family relationship) and determines what application (or URL) is required for the client in step S301.

That is, the client manager 410 determines an application related to a specific game (e.g., Tamagutchi) when the client' hobby is playing games (or determines a URL of an online book shopping mall when the client's hobby is reading books).

The SMS provider 420 transmits the determined application (or URL) and a short message for guiding setting of a function key corresponding to the application to the mobile terminal 200 through the wired/wireless communication network 300 in step S302.

Figure 4:
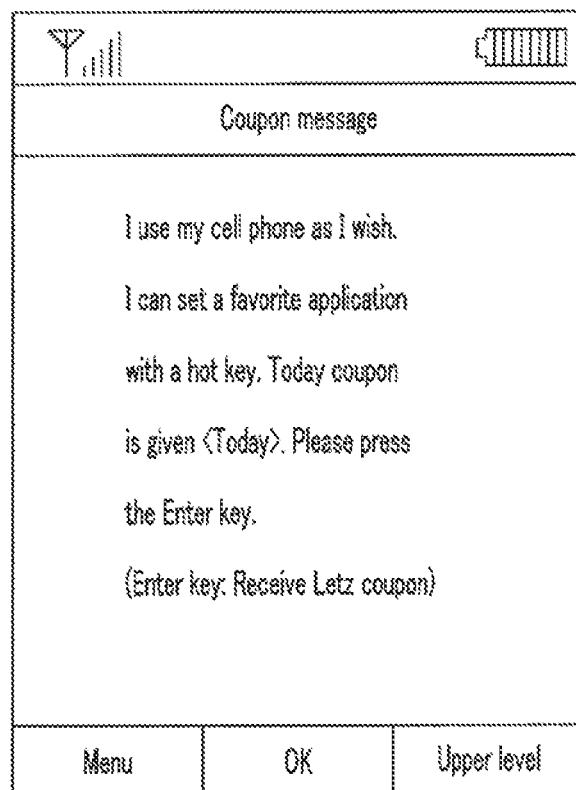
FIG. 4 to FIG. 6 show sequential screens for receiving a short message according to a first embodiment of the present invention.
Figure 5:
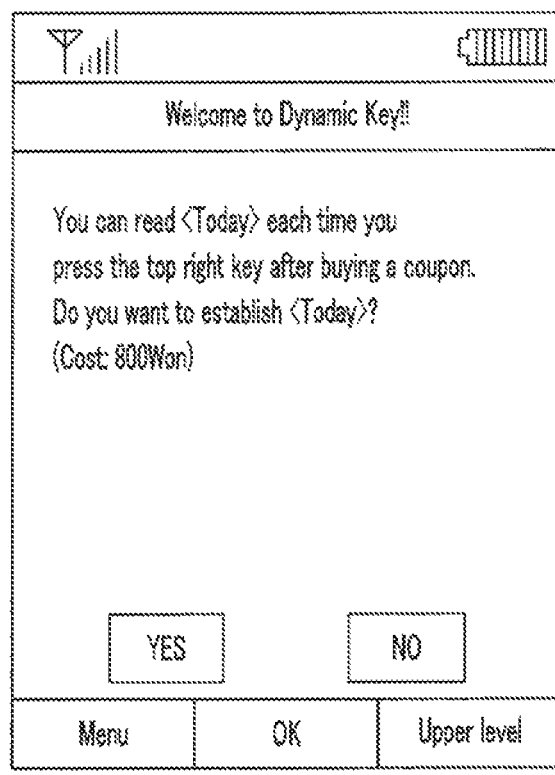
Figure 6:
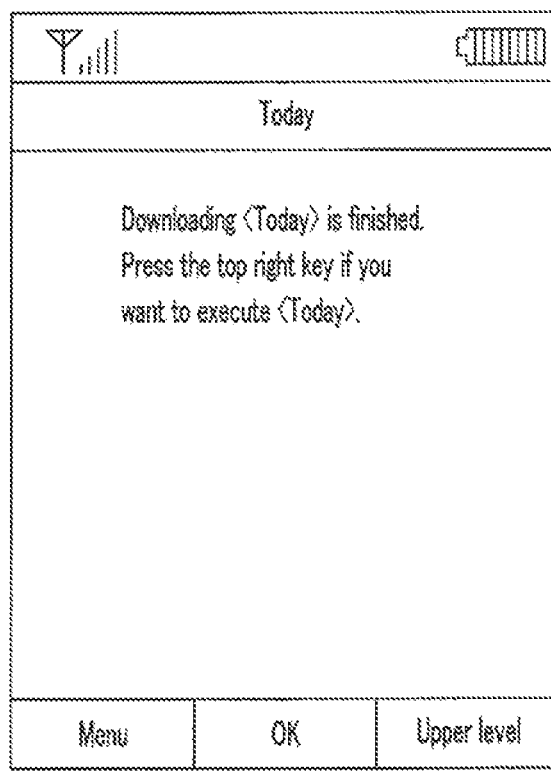

The data transmitter/receiver 110 of the user interface modifying system 100 receives a short message from the SMS provider 420 in step S303, and FIGS. 4 to 6 illustrate exemplary short messages in this case.

As shown in FIGS. 4 to 6, the short message includes an application to be downloaded by the client through a coupon receiving process and contents for setting function keys of the application, and guides how to modify the user interface.

The application downloader 120 downloads a corresponding application from the application provider/manager 430 in steps S305 and S306 depending on the granted state of the client having received the short message in step S304.

When the client requests a URL access corresponding to the online shopping mall, the URL access unit 130 accesses a specific URL through the URL provider/connector 440.

The expense settler/manager 450 provides and settles a service charge (e.g., 800 Won), that is, a cost for each application downloaded to the mobile terminal 200 in step S307.

The function key selector/modifier 140 controls the client to select a function key-corresponding to the downloaded application and modify the name of the selected function key according to the client's preference in step S308. FIG. 5 shows an exemplified method for setting the function key and modifying the name.

Figure 7:
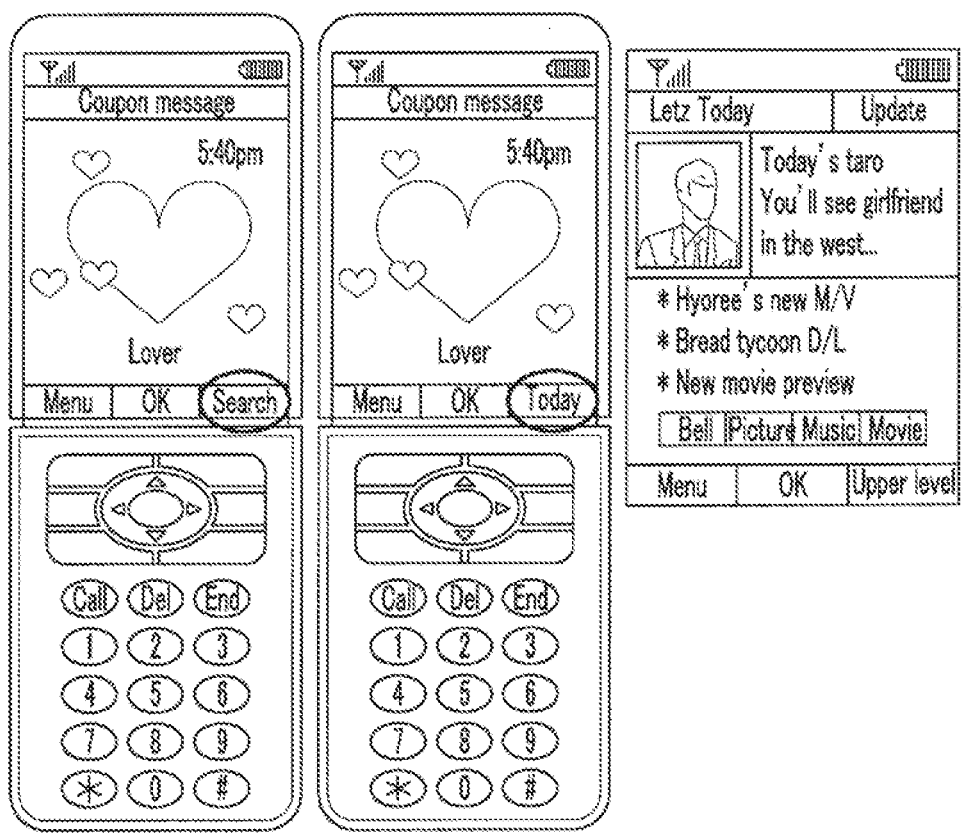
FIG. 7 shows screens for setting function keys and modifying a title according to a first embodiment of the present invention.

FIG. 7 shows screens for setting function keys and modifying a title according to a first embodiment of the present invention.

As shown in FIG. 7, the function key selector/modifier 140 modifies the interface of the function key having a search name into the interface called "Today" according to the request by the client.

The drive screen modifier 150 modifies the screen displayed when the downloaded application is driven into a drive screen having a different background according to the client's selection in step S309.

That is, when the client attempts to change the current drive screen of an application with the boyfriend's photo stored in the client's mobile terminal 200, the drive screen modifier 150 modifies the drive screen with the photo file selected by the client.

In this instance, the drive screen modifier 150 provides a preview screen to the client, and the client previews the drive screen of the application and either modifies the drive screen or uses the same as it is.

When the client clicks a specific function key on the mobile terminal, the interface provider 160 instantly provides an application corresponding to the clicked function key in step S310. Therefore, the present invention provides a user interface through which the client can randomly exchange the application mapped on the specific function key.

A system and method for downloading an application and providing the application to the mobile terminal by using a SIM card will now be described.

Figure 8:
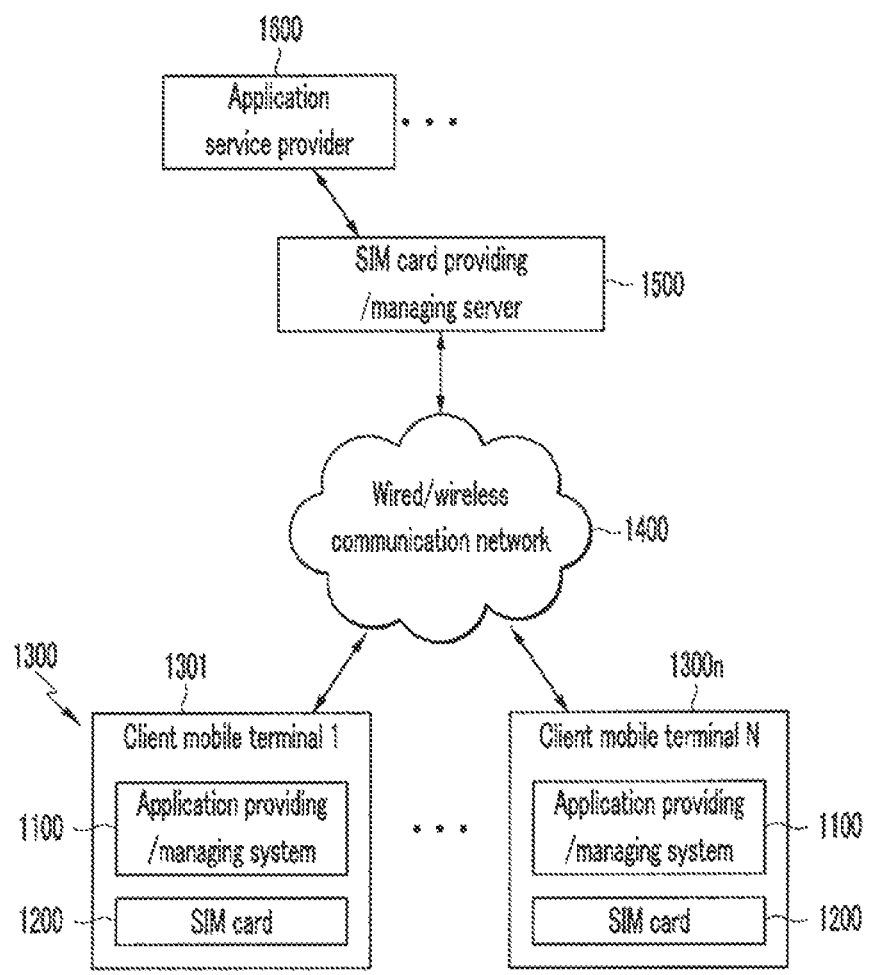
FIG. 8 shows a configuration of an application providing and managing system using a SIM card according to an embodiment of the present invention.

FIG. 8 shows a configuration of an application providing/managing system using a SIM card according to a second embodiment of the present invention.

As shown in FIG. 8, the application providing/managing system 1100 is respectively included in first to n client mobile terminals 1301 to 1300n, and the client mobile terminal 1300 is connected to a SIM card providing/managing server 1500 through a wired/wireless communication network 1400.

The SIM card providing and managing server 1500 is also connected to an application service provider 1600, and the respective client mobile terminals 1301 to 1300n have a configuration with a removable and attachable SIM card 1200 according to the second embodiment.

The above-configured application providing and managing system 1100 using a SIM card will now be described.

The SIM card providing/managing server 1500 newly develops and manages at least one application by allocating an ID for each application, and stores the allocated ID in the SIM card according to the second embodiment. Accordingly, the SIM card has subscriber information such as a user password, data for network registration, and IDs for respective applications.

The application providing/managing system 1100 uses the SIM card as an application supply card for downloading at least one application instead of using the SIM card as a smart card for user certification, which extends the usage of the SIM card.

The client buys a SIM card that stores an ID of the desired application by paying a predetermined amount of money, and installs the SIM card in the mobile terminal 1300.

The application providing/managing system 1100 of the client mobile terminal 1300 detects data of the SIM card installed in the terminal, reads an application ID from the subscriber information stored in the SIM card 1200, checks whether an application ID that corresponds to the read application ID is stored in the client mobile terminal 1300, and transmits the read application ID to the SIM card providing/managing server 1500 through the wired/wireless communication network 1400 when no corresponding application ID is found according to checked results.

The SIM card providing/managing server 1500 provides at least one application that is downloadable by the client mobile terminal 1300 to the client according to the received application ID, and the application providing/managing system 1100 selects an application according to the client's selection.

The application providing/managing system 1100 downloads the application selected by the client, establishes the function key that corresponds to the downloaded application according to the client's selection, and corrects the name of the established function key according to the client's selection.

The SIM card providing/managing server 1500 is described in the embodiment to provide a plurality of applications, and without being restricted to this, it is also possible to transmit the application ID to the server of the application service provider 1600 and control the server thereof to directly provide at least one application.

The application providing/managing system 1100 instantly drives the application corresponding to a clicked function key when the client clicks the function key, and in this instance, it is possible to change the screen of the driven application to a different drive screen according to the request by the client. That is, the application providing/managing system 1100 may change the look of the drive screen by using friends' photos, images, or avatars stored in the client mobile terminal 1300.

When the client clicks a specific function key, the application providing/managing system 1100 drives an application that corresponds to the clicked function key and concurrently displays the changed drive screen to thereby provide a user interface that allows the client to randomly change the application mapped on the specific function key.

The application providing/managing system using a SIM card according to the second embodiment extends the usage of the SIM card that was used as a user identification card to a card that may be used for easily downloading at least one application, thereby increasing service satisfaction of the client and service providers.

Further, the present invention allows the client to select a function key corresponding to the downloaded application, modify the name of the selected function key according to the client's preference, and change the drive screen of the executed application with a desired screen.

A detailed configuration of the application providing/managing system using a SIM card will now be described.

Figure 9:
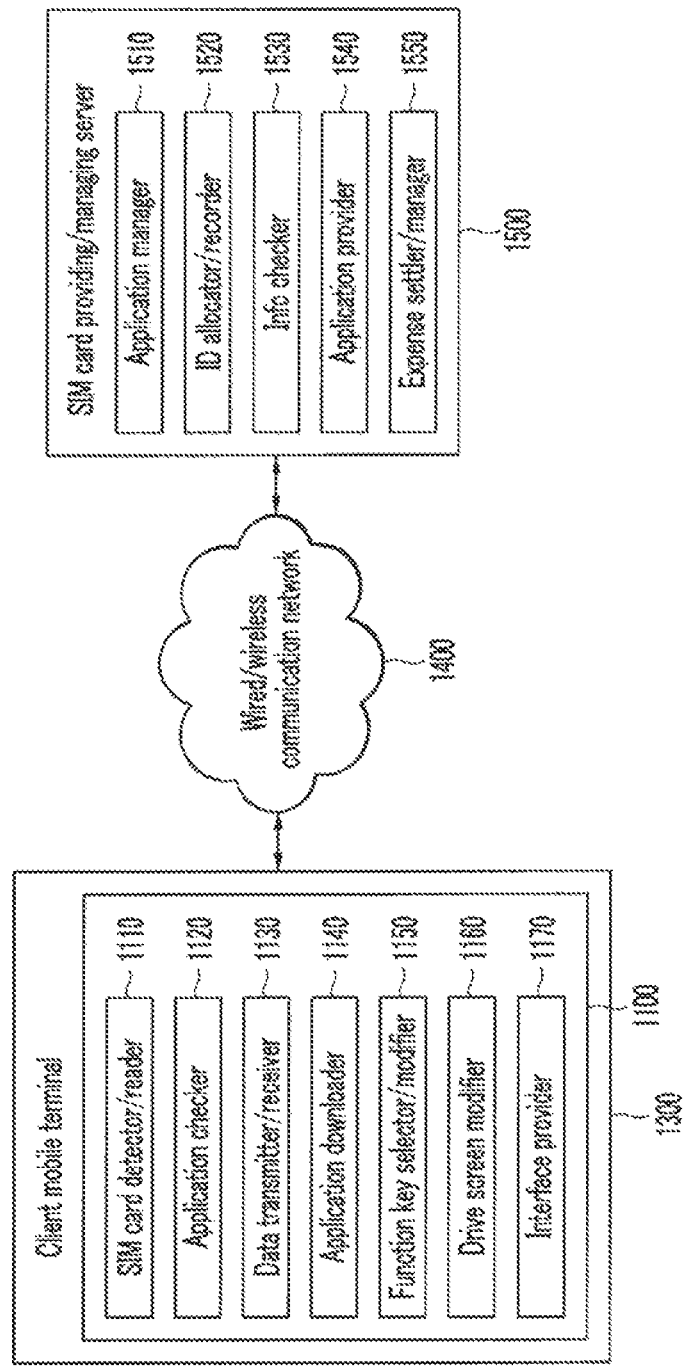
FIG. 9 shows a detailed configuration of the application providing and managing system using a SIM shown in FIG. 8.

FIG. 9 shows a detailed configuration of the application providing and managing system using a SIM shown in FIG. 8.

As shown in FIG. 9, the application providing and managing system 1100 using a SIM includes a SIM card detector/reader 1110, an application checker 1120, a data transmitter/receiver 1130, an application downloader 1140, a function key selector/modifier 1150, a drive screen modifier 1160, and an interface provider 1170.

The SIM card providing/managing server 1500 includes an application manager 1510, an ID allocator/recorder 1520, an information checker 1530, an application provider 1540, and an expense settler/manager 1550.

The application manager 1510 manages at least one application, and additionally develops and manages new applications.

The ID allocator/recorder 1520 allocates a proper ID to each application, and records the ID in the SIM card according to the second embodiment.

The information checker 1530 checks SIM card detection results provided by the client mobile terminal 1300 through the wired/wireless communication network 1400 and checks normal data states. That is, the information checker 1530 checks whether the application ID in the detection results is an ID that is normally issued by the ID allocator/recorder 1520.

The application provider 1540 provides at least one application according to checked information results, and provides a single application to the client mobile terminal 1300 according to the client's selection.

The expense settler/manager 1550 provides and settles a service charge, that is, a predetermined per-application cost (e.g., 800 Won) provided to the client mobile terminal 1300.

When a SIM card 1200 is installed in the client mobile terminal 1300, the SIM card detector/reader 1110 detects the installed SIM card and reads various types of information stored in the SIM card.

That is, the SIM card detector/reader 1110 reads a proper application ID from subscriber information recorded in the SIM card 1200.

The application checker 1120 checks whether an ID that corresponds to the application ID in the read data is stored in the client mobile terminal 1300.

The data transmitter/receiver 1130 transmits the read proper application ID to the SIM card providing/managing server 1500 through the wired/wireless communication network 1400 when no corresponding application ID is found according to checked results.

The application downloader 1140 downloads a single application, selected by the client from among the plural applications provided by the SIM card providing/managing server 1500, to the client mobile terminal 1300.

The function key selector/modifier 1150 selects a function key that corresponds to the downloaded application according to the client's selection, modifies the name of the selected function key according to the client's preference, and thereby provides a user interface that allows the client to randomly change the application mapped on the specific function key.

The function key selector/modifier 1140 may modify the name of the function key changed by the client into another name (one of second to nth names) depending on the requirement of the client. That is, the function key selector/modifier 1140 provides an interface for modifying the name of the function key corresponding to the downloaded application at least twice.

The drive screen modifier 1160 modifies the screen displayed when the downloaded application is executed into another drive screen with a different background according to the client's selection.

That is, when the client desires to change the drive screen of an application with a boyfriend's photo stored in the mobile terminal 1300, the drive screen modifier 1160 changes the drive screen of an application with the photo selected by the client.

In this instance, the drive screen modifier 1160 provides a preview screen to the client and controls the client to preview the drive screen of the application and either modify the drive screen or use the drive screen as it is. In this instance, the drive screen modifier 1160 may establish a function of displaying random images in an image storage box (not illustrated) as well as a single image.

When the client clicks a specific function key on the terminal, the interface provider 1170 instantly provides the application that corresponds to the clicked function key and also displays the modified drive screen.

An operation of the above-configured application providing/managing system using a SIM card will now be described.

Figure 10:
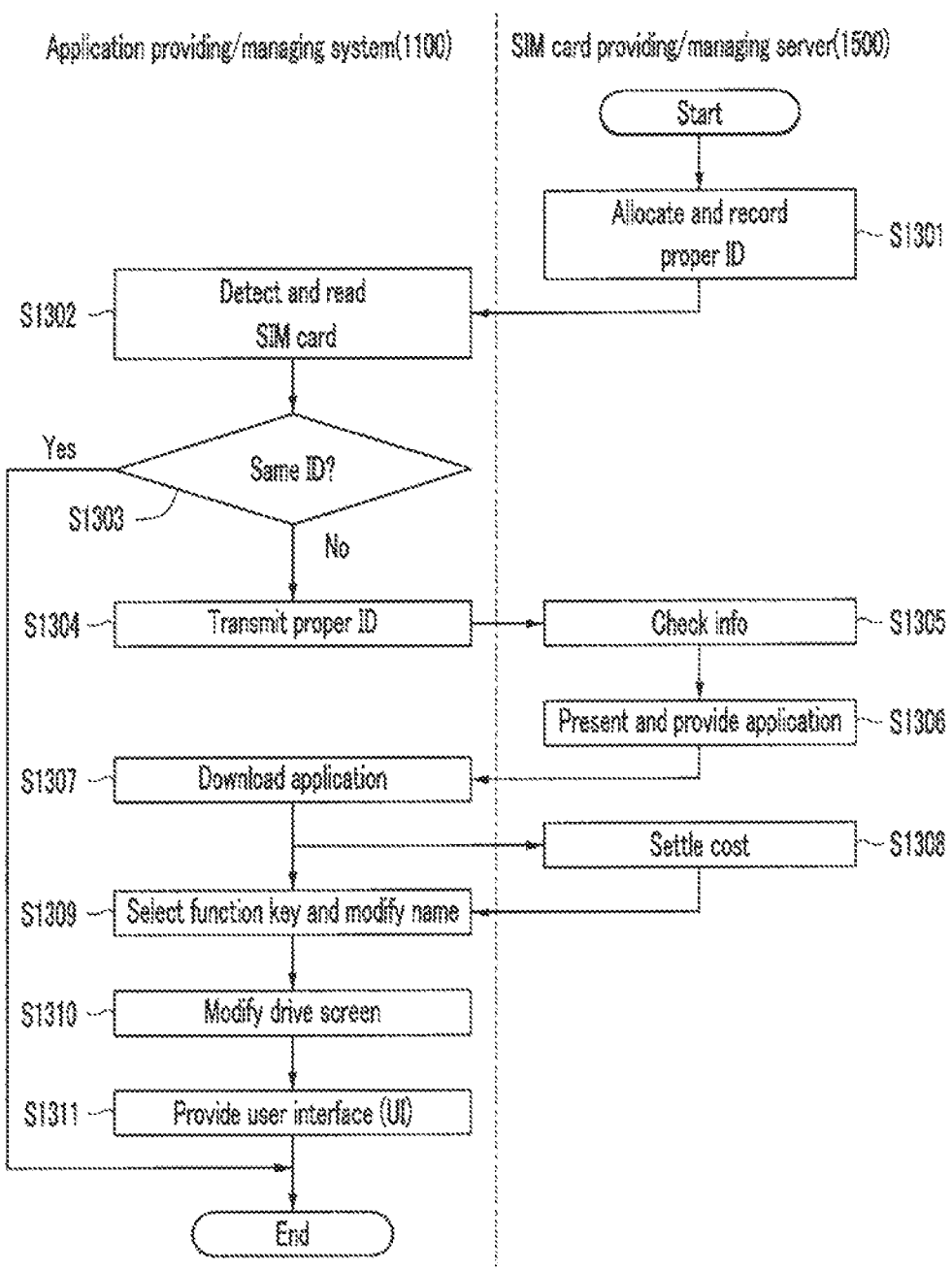
FIG. 10 shows a flowchart of an operation by the application providing and managing system using a SIM shown in FIG. 9.

FIG. 10 shows a flowchart of an operation by the application providing/managing system using a SIM shown in FIG. 9.

As shown in FIG. 10, the ID allocator/recorder 1520 allocates a proper ID to each application, and records the ID in the SIM card according to the second embodiment in step S1301.

When the client installs a SIM card 1200 storing a proper application ID in the mobile terminal 1300, the SIM card detector/reader 1110 detects the installed SIM card and reads various types of information stored in the SIM card in step S1302.

That is, the SIM card detector/reader 1110 reads network registration information and a proper application ID from subscriber information recorded in the SIM card 1200.

The application checker 1120 checks whether an ID that corresponds to the application ID in the read data is stored in the client mobile terminal 1300 in step S1303, and the data transmitter/receiver 1130 transmits the read proper application ID to the SIM card providing/managing server 1500 through the wired/wireless communication network 1400 in step S1304 when no corresponding application ID is found.

The information checker 1530 checks SIM card detection results provided by the client mobile terminal 1300 and checks normal data states in step S1305. That is, the information checker 1530 checks whether the application ID is an ID that is normally issued by the ID allocator/recorder 1520.

The application provider 1540 provides at least one application according to checked information results, and provides a single application to the client mobile terminal 1300 according to the client's selection in step S1306.

The application downloader 1140 downloads the single application selected by the client from the SIM card providing/managing server 1500 in step S1307.

The expense settler/manager 1550 provides and settles a service charge, that is, a per-application cost (e.g., 800 Won) provided to the client mobile terminal 1300 in step S1308.

The function key selector/modifier 1150 controls the client to select a function key that corresponds to the downloaded application, modifies the name of the selected function key according to the client's preference at least twice in step S1309.

The drive screen modifier 1160 modifies the drive screen displayed when the downloaded application is executed into another drive screen with a different background according to the client's selection in step S1310.

That is, when the client desires to change the drive screen of an application with a boyfriend's photo stored in the mobile terminal 1300, the drive screen modifier 1160 changes the drive screen of an application with the photo selected by the client.

In this instance, the drive screen modifier 1160 provides a preview screen to the client and controls the client to preview the drive screen of the application and either modifies the drive screen or uses the drive screen as it is.

When the client clicks a specific function key on the terminal, the interface provider 1170 instantly provides the application that corresponds to the clicked function key and also displays the modified drive screen in step S1311 thereby providing a user interface through which the client may randomly exchange the application mapped on a specific function key.

A system and method for providing an application to the client mobile terminal and managing the same will now be described.

Figure 11:
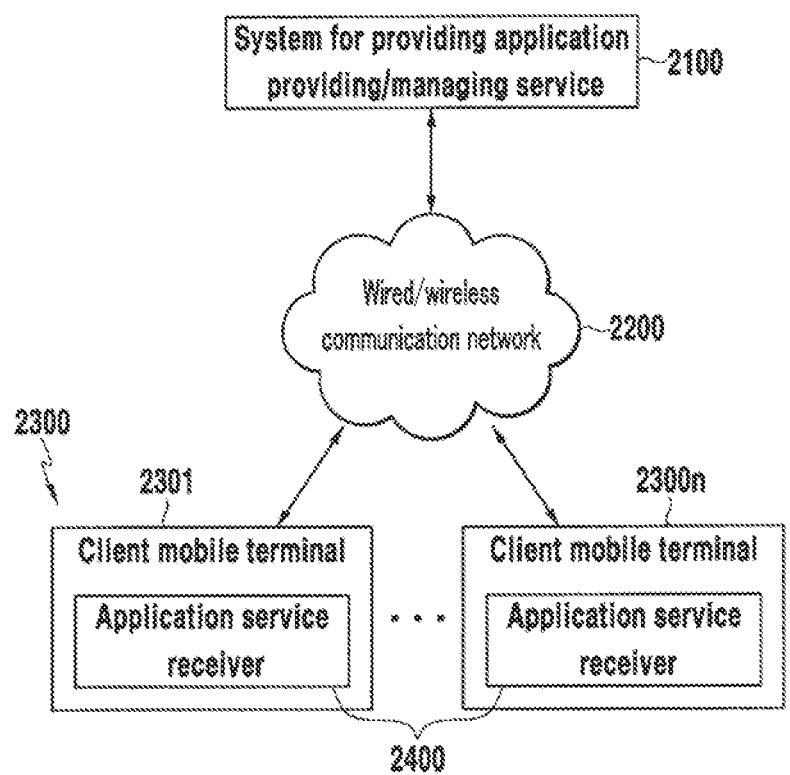
FIG. 11 shows a system for providing an application providing and managing service according to an embodiment of the present invention.

FIG. 11 shows a system for providing an application providing/managing service according to a third embodiment of the present invention.

As shown in FIG. 11, the system 2100 for providing an application providing/managing service is connected to a plurality of client mobile terminals 2301 to 2300n through a wired/wireless communication network 2200, and each of client mobile terminals 2301 to 2300n includes an application service receiver 2400.

The above-configured system 2100 for providing an application providing/managing service will now be described.

The system 2100 for providing an application providing/managing service respectively allocates a proper ID to the client who desires to receive the application providing/managing service according to the third embodiment.

The third embodiment describes the allocation of proper ID to each client, and without being restricted to this, it is possible to use a telephone number of the client mobile terminal as a proper ID.

On allocating the proper ID, the system 2100 for providing an application providing/managing service provides basic applications (as default) to the client mobile terminal 2300 according to the client personal information (e.g., sex, occupation, and hobby).

When the client accesses the wired/wireless communication network 2200 by using the allocated proper ID, the system 2100 for providing an application providing/managing service checks a usage pattern (e.g., an event log) of the mobile terminal 2300. That is, the system 2100 checks, for a predetermined period, the usage patterns including URLs accessed by the client mobile terminal 2300 and applications driven by the same.

The system 2100 for providing an application providing/managing service provides at least one application to the client mobile terminal 2300 according to checked results, and the client selects a single application from the provided applications to thus receive an application of new version or of his preference.

The system 2100 for providing an application providing/managing service repeats the above process to update the application of the client mobile terminal.

Accordingly, the system 2100 for providing an application providing/managing service increases service satisfaction by periodically providing and updating applications desired by the client or new applications for each client mobile terminal.

The application service receiver 2400 selects a function key on the terminal that corresponds to the application downloaded from the system 2100 for providing an application providing/managing service according to the client's selection, and modifies the name of the selected function key service according to the client's selection.

In addition, the application service receiver 2400 directly performs the application that corresponds to the clicked function key when the client clicks the function key, and modifies the drive screen of the executed application to a different drive screen according to the client's request. That is, the application service receiver 2400 modifies the drive screen with friends' photos or various avatars stored in the client mobile terminal 2300.

As described, the system 2100 for providing an application providing/managing service allows the client to select the function key that corresponds to the provided application, modify the name of the selected function key according to the client's preference, and change the screen of the driven application with a desired screen.

Therefore, the present invention increases service satisfaction by providing a user interface through which the client may randomly exchange the application mapped on a specific function key.

A detailed configuration of the above-configured system for providing an application providing/managing service will now be described.

Figure 12:
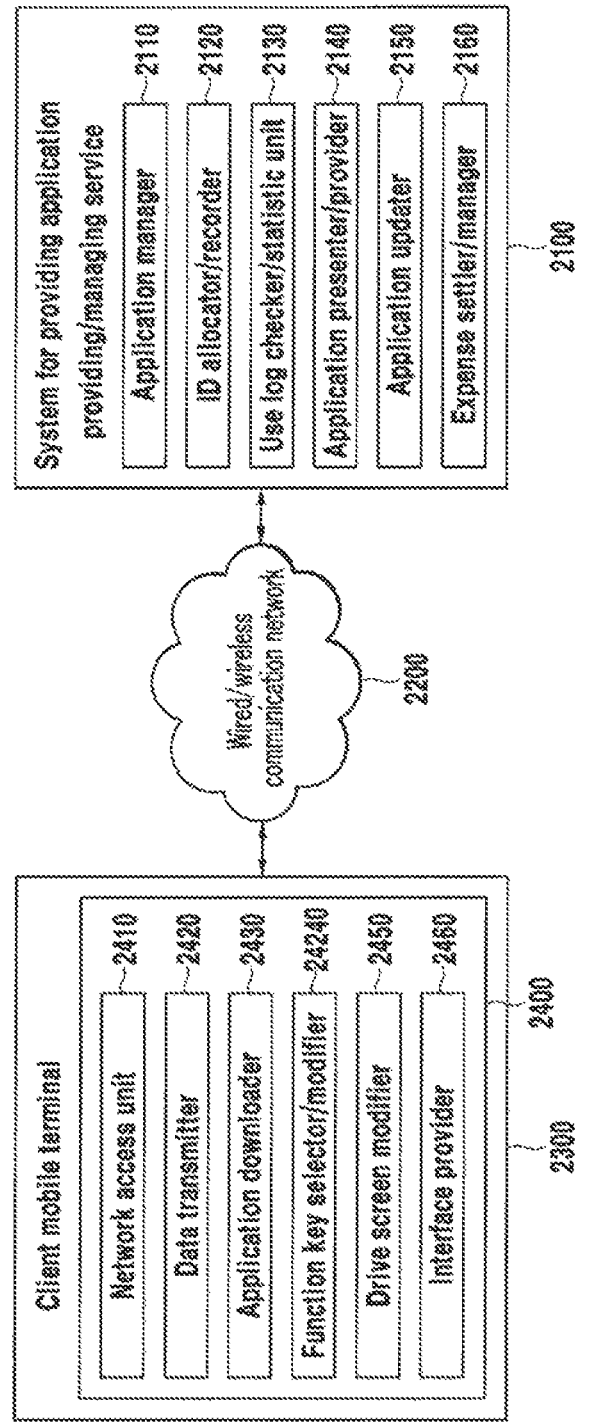
FIG. 12 shows a detailed system for providing an application providing and managing service shown in FIG. 11.

FIG. 12 shows a detailed system for providing an application providing/managing service shown in FIG. 11.

As shown in FIG. 12, the system 2100 for providing an application providing/managing service includes an application manager 2110, an ID allocator/manager 2120, a use log checker/statistic unit 2130, and application presenter/provider 2140, an application updater 2150, and an expense settler/manager 2160.

The application service receiver 2400 includes a network access unit 2410, a data transmitter/receiver 2420, an application downloader 2430, a function selector/modifier 2440, a drive screen modifier 2450, and an interface provider 2460.

In detail, the application manager 2110 stores and manages at least one application, and manages new applications by additionally developing and updating the new applications.

The ID allocator/manager 2120 allocates a proper ID to each client who requests the application providing/managing service according to the third embodiment, and sorts and manages the allocated proper ID according to a predetermined reference. If needed, the ID allocator/manager 2120 may sort and manage the telephone number of the client mobile terminal as a proper ID.

The use log checker/statistic unit 2130 checks the use log of the client mobile terminal connected to the network 2200 by using the allocated proper ID for a predetermined period, and sorts checked results according to a predetermined reference.

The application presenter/provider 2140 presents at least one application to the client mobile terminal 2300 according to results of checking use logs of client mobile terminals, and provides a single application to the client mobile terminal 2300 according to the client's selection.

The application updater 2150 additionally provides applications of new versions and updates the applications stored in the client mobile terminal 2300 according to the results of checking use logs of client mobile terminals or personal information.

The expense settler/manager 2160 provides and settles a service charge (e.g., 800 Won), that is, a per-application cost for a new application or an updated application provided to the client mobile terminal 2300.

The network access unit 2410 of the application service receiver 2400 accesses a specific URL through the wired/wireless communication network 2200 according to the client's selection.

The data transmitter/receiver 2420 controls data transmission/reception to/from the system 2100 for providing an application providing/managing service through the wired/wireless communication network 2200.

The application downloader 2430 downloads at least one application from the application presenter/provider 2140 and downloads an updated application for the stored application from the application updater 2150 according to the granted state of the client.

The function selector/modifier 2440 selects a function key corresponding to the downloaded application, and modifies the name of the selected function key to thus provide a user interface through which the client may exchange the application mapped on a specific function key.

The drive screen modifier 2450 modifies the drive screen displayed when the downloaded application is performed to a drive screen with a different background according to the client's selection. In this instance, the drive screen modifier 2450 provides a preview screen to the client so that the client may preview the drive screen of the application and either modify the drive screen or use the same as it is.

When the client clicks a specific function key on the terminal, the interface provider 2460 provides an application corresponding to the clicked function key and concurrently provides a modified drive screen.

The system for providing an application providing/managing service according to the third embodiment is described to periodically check and analyze use logs for each mobile terminal and provide an appropriate application to the corresponding mobile terminal, and without being restricted to this, the system may search and provide the application recommended by the client.

An operation of the above-configured system for providing an application providing/managing service will now be described.

FIG. 13 shows a flowchart of an operation by the system for providing an application providing and managing service shown in FIG. 12.

As shown in FIG. 13, the ID allocator/manager 2120 allocates a proper ID for each client mobile terminal in step S2301, and the application presenter/provider 2140 provides basic applications (as default) according to the client personal information (e.g., sex, occupation, and hobby) in step S2302.

That is, the application presenter/provider 2140 provides appropriate basic applications according to the client's sex or occupation.

The network access unit 2410 allows the client to access the wired/wireless communication network 2200 based on a dedicated ID given to the client in step S2303, or perform the application stored in the mobile terminal 2300.

The use log checker/statistic unit 2130 checks use logs for the respective client mobile terminals according to the allocated proper IDs, analyzes checked results, and generates the analyzed results into statistic data in step S2304.

The application presenter/provider 2140 presents at least one application appropriate for the client according to the use log analysis results, and provides a single application selected by the client from among the presented applications to the corresponding client mobile terminal in step S2305.

The application downloader 2430 of the application service receiver 2400 downloads a single application in step S2306.

The application updater 2150 repeats the above process to update the application stored in the client mobile terminal in step S2307 or provide a new application and thereby increase service satisfaction.

The expense settler/manager 2160 provides and settles a service charge, that is, an application cost for a new application or an updated application for each client mobile terminal in step S2308.

The function selector/modifier 2440 selects a function key corresponding to the downloaded application according to the client' selection, and modifies the name of the selected function key according to the client's preference in step S2309.

The drive screen modifier 2450 modifies the drive screen displayed when the downloaded application is performed to a drive screen with a different background according to the client's selection in step S2310.

That is, when the client desires to change the drive screen of the application with a boyfriend's photo stored in the client mobile terminal 2300, the drive screen modifier 2450 modifies the drive screen of the application with the photo file selected by the client.

In this instance, the drive screen modifier 2450 provides a preview screen to the client so that the client may preview the drive screen of the application and either modify the drive screen or use the same as it is.

When the client clicks a specific function key on the terminal, the interface provider 2460 provides an application corresponding to the clicked function key in step S2311, and concurrently provides a modified drive screen.

Therefore, the present invention provides a user interface through which the client may randomly exchange the application mapped on a specific function key.

Also, the system and method for providing an application providing/managing service increases service satisfaction by updating the stored applications for each client mobile terminal or periodically providing new applications.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, time and cost for downloading applications are saved by directly downloading the applications according to a granted state of connection on the received short message.

Also, the usage of SIM card is extended by using the SIM card not only as a smart card for user certification but also as a card for downloading at least one application.

Further, the client's service satisfaction is increased by periodically checking the use logs for respective client mobile terminals and updating stored applications, or by periodically providing new applications.

In addition, a user interface through which the client may exchange the application mapped on a specific function key is provided by allowing the client to select a function key that corresponds to the downloaded application and modify the name of the selected function key.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing an application providing/managing service to a client mobile terminal in a system connected to the client mobile terminal through a wired/wireless network, the method comprising the steps of:
    associating a proper ID with each client mobile terminal and managing the proper ID;
    processing, including collecting and analyzing, at least one of a use log and a usage pattern for each client mobile terminal connected to the wired/wireless network through the corresponding proper ID, wherein the use log and the usage pattern are associated with at least one of a uniform resource locator (URL) access and an application usage of the each client mobile terminal; and
    presenting at least one application to the client mobile terminal according to analysis results and providing, to the client mobile terminal, a single application, if selected by the user, from among the presented applications and a guide for establishing a function key associated with an execution of the single application on the client mobile terminal, wherein (i) the single application is executed by the function key established on the client mobile terminal, and (ii) the function key is established through a mapping of the single application to one function key selected by the user among preset function keys of the client mobile terminal,
    wherein the step of processing, including collecting and analyzing, at least one of a use log and a usage pattern includes collecting and analyzing autonomously from a user of the client mobile terminal.

2. The method of claim 1, comprising the step of updating the at least one application stored in the client mobile terminal according to the analysis results.

3. The method of claim 1, wherein, when selected by the user, the step of providing the single application comprises:
    initiating a transaction for payment of application cost;
    receiving payment of the application cost for the transaction; and
    transferring the single application to the client mobile terminal based on the transaction,
        wherein the single application is at least one of a new application and an updated application.

4. The method of claim 1, comprising the step of updating a list of the presented applications stored in the client mobile terminal according to the analysis results.

5. The method of claim 1, comprising the step of collecting at least one of a use log and a usage pattern anonymously.

6. A method for providing an application providing/managing service to a client mobile terminal in a system connected to the client mobile terminal through a wired/wireless network, the method comprising the steps of:
    associating a proper ID with the client mobile terminal managed by a server;
    processing, including collecting and analyzing, at least one of a use log and a usage pattern for the client mobile terminal connected to the wired/wireless network through the corresponding proper ID and providing analysis results, wherein the use log and the usage pattern are associated with at least one of a uniform resource locator (URL) access and an application usage of the client mobile terminal; and presenting at least one application to the client mobile terminal according to the analysis results and providing, to the client mobile terminal, a single application, if selected by the user, from among the presented applications and a guide for establishing a function key associated with an execution of the single application on the client mobile terminal, wherein (i) the single application is executed by the function key established on the client mobile terminal, and (ii) the function key is established through a mapping of the single application to one function key selected by the user among preset function keys of the client mobile terminal, wherein the step of processing, including collecting and analyzing, at least one of a use log and a usage pattern includes collecting and analyzing autonomously from a user of the client mobile terminal.

7. The method of claim 6, wherein, when selected by the user, the step of providing the single application comprises:
initiating a transaction for payment of application cost;
receiving payment of the application cost for the transaction; and
transferring the single application to the client mobile terminal based on the transaction,
wherein the single application is at least one of a new application and an updated application.

8. The method of claim 6, wherein the step of presenting at least one application further comprises exchanging, by the client mobile terminal based on the processing step, messages with the server so as to obtain a group of applications, and the presenting step presents the at least one application from the group.

9. The method of claim 6, comprising the step of updating the at least one application stored in the client mobile terminal according to the analysis results.

10. The method of claim 6, comprising the step of updating a list of the presented applications stored in the client mobile terminal according to the analysis results.

11. The method of claim 6, comprising the step of collecting at least one of a use log and a usage pattern anonymously.

12. Apparatus for providing an application providing/managing service to a client mobile terminal in a system connected to the client mobile terminal through a wired/wireless network, the apparatus comprising:
an ID allocator/manager configured to associate a proper ID with each client mobile terminal and to manage the proper ID;
an information checker configured to process, through collecting and analyzing, at least one of a use log and a usage pattern for each client mobile terminal connected to the wired/wireless network through the corresponding proper ID, wherein the use log and the usage pattern are associated with at least one of a uniform resource locator (URL) access and an application usage of the each client mobile terminal; and
an application presenter/provider configured to present at least one application to the client mobile terminal according to analysis results through the information checker and to provide, to the client mobile terminal, a single application, if selected by the user, from among the presented applications and a guide for establishing a function key associated with an execution of the single application on the client mobile terminal, wherein (i) the single application is executed by the function key established on the client mobile terminal, and (ii) the function key is established through a mapping of the single application to one function key selected by the user among preset function keys of the client mobile terminal, wherein the ID allocator/manager associates a proper ID in combination with the checker/statistic unit configured to collect at least one of a use log and a usage pattern anonymously, and wherein the checker/statistic unit collects and analyzes autonomously from a user of the client mobile terminal.

13. The apparatus of claim 12, comprising an application updater configured to update the at least one application stored in the client mobile terminal according to the analysis results.

14. The apparatus of claim 13, wherein at least one of the application presenter/provider and the application updater are configured to update a list of the presented applications stored in the client mobile terminal according to the analysis results.

15. A client mobile terminal registered with an application providing/managing service from a system server connected to the client mobile terminal
through a wired/wireless network, the client mobile terminal comprising:
a reader/application checker configured to associate a proper ID with within the client mobile terminal managed by the server;
a data transmitter/receiver adapted to provide, for analysis results through collection and analysis, data of at least one of a use log and a usage pattern for the client mobile terminal connected to the wired/wireless network through the corresponding proper ID, wherein the use log and the usage pattern are associated with at least one of a uniform resource locator (URL) access and an application usage of the client mobile terminal; and
an application service receiver configured to accept at least one application presented to the client mobile terminal according to analysis results and configured to receive a single application, if selected by the user, from among the presented applications to the client mobile terminal and a guide for establishing a function key associated with an execution of the single application on the client mobile terminal, wherein (i) the single application is executed by the function key established on the client mobile terminal, and (ii) the function key is established through a mapping of the single application to one function key selected by the user among preset function keys of the client mobile terminal,
wherein the first and second modules are configured to operate so as to collect and analyze based on the associated ID anonymously and autonomously from a user of the client mobile terminal.

16. The client mobile terminal of claim 15, further comprising a third module configured to exchange, by the client mobile terminal based on operation of the second module, messages with the server so as to accept and to present the at least one application.

17. The client mobile terminal of claim 15, comprising an application downloader configured to receive and update one or more of the at least one application and a list of the presented applications stored in the client mobile terminal according to the analysis results.

18. The apparatus of claim 12, wherein the function key is modified based on user selection.

* * * * *